C. M. MINTON.
CROSSCUT SAW HANDLE.
APPLICATION FILED AUG. 14, 1912.
1,068,358.
Patented July 22, 1913.
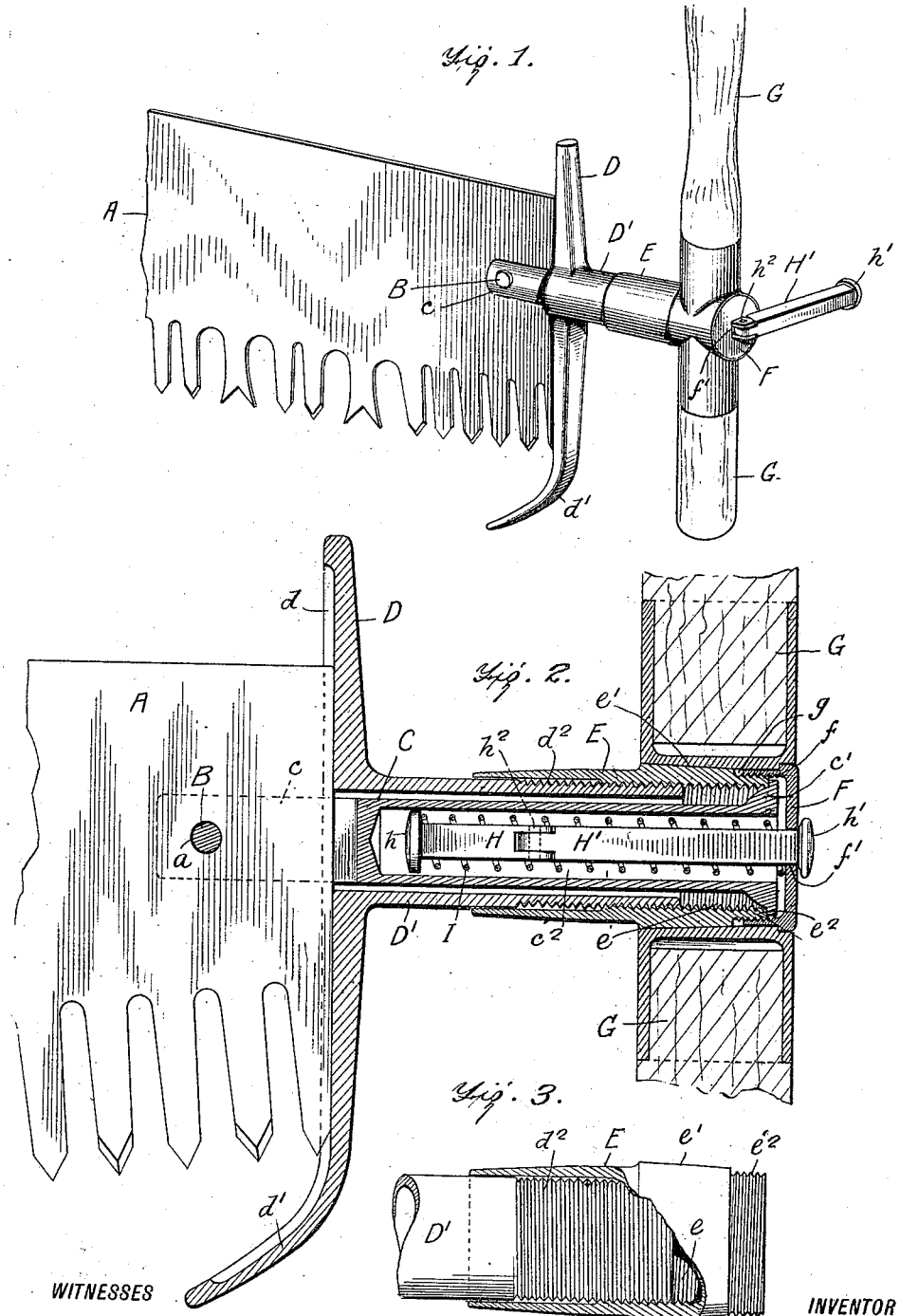
WITNESSES
INVENTOR
CHARLES M. MINTON,
BY
ATTORNEYS

UNITED STATES PATENT OFFICE.

CHARLES MONROE MINTON, OF PHILOMATH, OREGON, ASSIGNOR TO CHARLES STEPHENS, OF PHILOMATH, OREGON.

CROSSCUT-SAW HANDLE.

1,068,358. Specification of Letters Patent. Patented July 22, 1913.

Application filed August 14, 1912. Serial No. 714,980.

*To all whom it may concern:*

Be it known that I, CHARLES M. MINTON, a citizen of the United States, and a resident of Philomath, in the county of Benton and State of Oregon, have invented a certain new and useful Improvement in Crosscut-Saw Handles, of which the following is a specification.

My present invention relates to handles for cross cut saws, my primary object being to provide a simple, light construction possessing strength and durability and by which a saw may be readily and quickly clamped and the angular extension of the handle as readily and quickly adjusted with respect thereto, all without the necessity of screw bolts and other parts requiring the use of additional tools.

Further objects, and the resultant advantages, of my improvements will be clear from the following description in which reference is made to the accompanying drawing forming a part of this specification, and in which, Figure 1 is a perspective view illustrating my improved handle in connection with a cross cut saw blade; Fig. 2 is a central longitudinal section taken therethrough; and Fig. 3 is a detail view, partly broken away, illustrating parts to be hereinafter specifically referred to.

Referring now to these figures, the saw blade A is provided adjacent its end with a centrally located opening $a$, through which is adapted to extend the coupling pin B. Connected by means of this pin B, is a clamping bar C, this bar having a bifurcated inner end and the bifurcations indicated at $c$ having openings through which the pin also extends.

As shown particularly in Fig. 2, the bar C is provided with a circular head $c'$ at its outer end and with a base $c^2$ extending inwardly from said outer end to a point adjacent the base of its bifurcations $c$.

The guard D is disposed transversely of the blade A and has a longitudinal slot $d$ in which the blade end is adapted to seat, in addition to which it is provided with an extended end $d'$ curved around the toothed blade edge so as to effectively prevent injury to the sawer. The guard D is formed by the oppositely extending integral portions of one end of a tubular member D' which is sleeved on the clamping bar C between the blade end and the bar head $c'$, and the outer portion of which is provided with external right-hand threads $d^2$.

Mounted on the tubular member D' is a bearing sleeve E having internal threads at $e$ adapted to coöperate with the external threads $d^2$ of said tubular member whereby when the sleeve E is turned in a direction (to the right) adapted to move it longitudinally away from the tubular member, its outer end will engage the head $c'$ of the clamping bar and thus force the latter with it until the end of the saw blade A is seated and tightly engaged with the guard slot $d$.

The outer end of the sleeve E is provided with a tapered portion $e'$ and a reduced threaded extremity $e^2$, the latter being adapted to coöperate with the internally threaded flange $f$ of a cap nut F.

The tapered sleeve portion $e'$ is adapted to receive the conformably shaped transverse bore $g$ of the handle proper G, this bore also surrounding the cap nut F and having an internal shoulder, inwardly against which is presented a circular shoulder formed around said cap nut. Thus the handle proper G is confined on the taper of the sleeve F and may be tightened or loosened by rotating the nut F to the left or right respectively, the threads of the nut and its complementary portion of the sleeve being left hand ones. To the end that this rotation of nut F may be quickly and easily accomplished without the use of additional tools and the necessity of having such tools at hand, the nut is provided with a squared central opening $f'$ through which extends a squared bar, headed at its opposite ends at $h$ and $h'$ and comprising inner and outer portions H and H', the contiguous ends of which are connected by a hinged joint $h^2$.

The bar just described is normally maintained at full length within the bore $c^2$ of the clamping bar C by means of a spring I coiled thereabout and extending between the nut F and its inner head $h$, and in order to rotate the nut it is necessary for the operator to grasp the outer head $h'$ and pull the bar outwardly until the hinged joint $h^2$ is exposed at which time the outer bar portions H' may be moved to an angular position with respect to the inner portion and thus form a crank as shown in Fig. 1.

Thus with the parts clamped in the position shown in Figs. 1 and 2, the handle G may be turned to the right and the clamping bar C loosened to an extent sufficient to permit withdrawal of the pin B and complete detachment of the handle from the saw blade A. On the other hand, the handle proper G may be loosened on the sleeve E by manipulating the crank bar as before described in order that said handle proper may be moved to, and again locked in, a selected degree of angularity with respect to the saw blades.

Thus it will also be seen that in the practical use of my invention no tools will be required in the manipulating or adjustment of its several parts.

I claim:—

1. A saw handle comprising, in combination, a saw clamping bar, a member movable on said bar and carrying a guard engaging with the end of a saw blade, a bearing member engaging portions of said member and said bar and adjustable with respect thereto, a handle proper disposed on said bearing member, and a screw member for normally locking said handle proper on said bearing member forming a cap to cover the outer end of the clamping bar and the bearing member.

2. A saw handle comprising, in combination, a saw clamping bar, an end guard adjustable on said bar, a member for adjusting said guard with respect to said clamping bar, a handle proper rotatable on said adjusting member, said member and said handle proper having coöperating tapered portions, a screw member for normally locking said handle proper on said adjusting member, and a handle for said last named member.

3. A saw handle comprising, in combination, a saw clamping bar having a longitudinal bore therein, an end guard adjustable on said bar, a member for adjusting said guard with respect to said clamping bar, a handle proper rotatably disposed on the said adjusting member, a screw member for normally locking said handle proper on said adjusting member, and a handle having a non-rotatable connection with said last named member and which is movable with respect thereto and within and out of the bore of the clamping bar.

4. A saw handle comprising, in combination, a saw clamping member, having a longitudinal bore therein, an adjusting member, a handle proper movably mounted circumjacent said adjusting member, a nut for normally locking the said handle proper in connection with the said adjusting member, and a handle extending through and non-rotatably connected with the nut and movable within and out of the bore within said saw clamping member.

5. A saw handle comprising, in combination, a saw clamping bar, an end guard adjustable with respect to said bar, a member engaging said guard and said bar for adjusting the same and having a tapered portion, a handle proper having a tapered transverse bore adapted to fit said tapered portion of said adjusting member, a nut threaded on a portion of said adjusting member and bearing against said handle proper whereby to force the latter to tightly engage the adjusting member, and a handle for said nut.

6. A saw handle comprising, in combination, a saw clamping bar having a bore in its outer end, an end guard adjustable on said bar, an adjusting member engaging said guard and said bar for moving the same with respect to one another, a handle proper disposed on said adjusting member, a nut engaging portions of said adjusting member and said handle proper for locking the same together, and provided with an opening, and a handle for rotating said nut loosely extending through its said opening and movable within and out of the bore of said clamping bar.

CHARLES MONROE MINTON.

Witnesses:
R. E. SCOTT,
G. F. STEELE.